United States Patent
Nagashima

(10) Patent No.: US 10,599,119 B2
(45) Date of Patent: Mar. 24, 2020

(54) LADDER-PROGRAM MANAGING DEVICE

(71) Applicant: FANUC CORPORATION, Yamanashi (JP)

(72) Inventor: Noritake Nagashima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/822,316

(22) Filed: Nov. 27, 2017

(65) Prior Publication Data

US 2018/0150046 A1 May 31, 2018

(30) Foreign Application Priority Data

Nov. 29, 2016 (JP) .................................. 2016-231679

(51) Int. Cl.
G05B 19/05 (2006.01)

(52) U.S. Cl.
CPC .... G05B 19/056 (2013.01); *G05B 2219/1105* (2013.01); *G05B 2219/13004* (2013.01);
(Continued)

(58) Field of Classification Search
CPC .................................................. G05B 19/056
(Continued)

(56) References Cited

U.S. PATENT DOCUMENTS

| 7,143,366 B1 | 11/2006 | McKelvey et al. |
| 2003/0023616 A1 | 1/2003 | Kay et al. |

(Continued)

FOREIGN PATENT DOCUMENTS

| CN | 101786577 A | 7/2010 |
| CN | 106066635 A | 11/2016 |

(Continued)

OTHER PUBLICATIONS

Japanese Office Action dated Jun. 26, 2018, for Japanese Patent Application No. 2016-231679.
(Continued)

*Primary Examiner* — Mohammad Ali
*Assistant Examiner* — Joshua T Sanders
(74) *Attorney, Agent, or Firm* — Karceski IP Law, PLLC

(57) ABSTRACT

A ladder-program managing device includes: a database that has a ladder-program-storing region in which ladder program for individually controlling a plurality of pieces of machinery are stored, and that contains ladder-program-history information storing, in association with each other, identification information for identifying contents of alterations that have already been applied to the plurality of pieces of machinery and correction programs required to perform the alterations; and a database managing portion that manages the database, wherein the database managing portion is provided with an identification-information-searching portion that searches for, in the ladder-program-history information, identification information corresponding to an alteration content to be applied to an alteration-target machinery, and a merging portion that identifies the correction program corresponding to the searched identification information in the ladder-program-history information, and that merges the correction program with the ladder program for the alteration-target machinery.

1 Claim, 9 Drawing Sheets

(52) U.S. Cl.
CPC ............. *G05B 2219/13085* (2013.01); *G05B 2219/13152* (2013.01)

(58) Field of Classification Search
USPC .......................................................... 700/18
See application file for complete search history.

(56) References Cited

U.S. PATENT DOCUMENTS

| | | |
|---|---|---|
| 2005/0021156 A1 | 1/2005 | Kay et al. |
| 2006/0190106 A1 | 8/2006 | Kay et al. |
| 2011/0225216 A1 | 9/2011 | Kay et al. |
| 2013/0198248 A1 | 8/2013 | Kay et al. |
| 2014/0129550 A1* | 5/2014 | Weatherhead .......... G06F 17/30 707/723 |
| 2016/0314108 A1 | 10/2016 | Mizuno |
| 2017/0039221 A1 | 2/2017 | Kay et al. |

FOREIGN PATENT DOCUMENTS

| | | |
|---|---|---|
| JP | H04060806 A | 2/1992 |
| JP | H06110540 | 4/1994 |
| JP | H10040085 A | 2/1998 |
| JP | H10340108 A | 12/1998 |
| JP | 2002163020 A | 6/2002 |
| JP | 2004005400 | 1/2004 |
| JP | 2006330867 | 12/2006 |
| JP | 2007128450 A | 5/2007 |
| JP | 2011113254 A | 6/2011 |
| JP | 2011238079 A | 11/2011 |
| WO | 2008012919 A1 | 1/2008 |

OTHER PUBLICATIONS

Search Report by Registered Searching Authority dated Jun. 19, 2018, for Japanese Patent Application No. 2016-231679.
German Office Action dated Apr. 30, 2019, for German Patent Application No. 102017220653.5.
Chinese Office Action dated Mar. 20, 2019, for Chinese Patent Application No. 201711195876.6.

\* cited by examiner

LADDER-PROGRAM MANAGING DEVICE

CROSS-REFERENCE TO RELATED APPLICATIONS

This application is based on and claims priority to Japanese Patent Application No. 2016-231679, filed on Nov. 29, 2016, the entire content of which is incorporated herein by reference.

FIELD OF THE INVENTION

The present invention relates to a ladder-program managing device that is suitable for managing a ladder-program history.

BACKGROUND OF THE INVENTION

In the related art, there is a known technology with which figure numbers and version numbers of a ladder program in a numerical control device at a remote location are acquired via a network and managed in a centralized manner (for example, see Japanese Unexamined Patent Application, Publication No. Hei 6-110540).

In addition, in the related art, there is a known technology for managing a ladder-program history (for example, see Japanese Unexamined Patent Application, Publication No. 2006-330867).

SUMMARY OF THE INVENTION

An aspect of the present invention is a ladder-program managing device including: a database that has a ladder-program-storing region in which ladder programs for individually controlling a plurality of pieces of machinery are stored, and that contains ladder-program-history information storing, in association with each other, identification information for identifying contents of alterations that have already been applied to the plurality of pieces of machinery and correction programs required to perform the alterations; and a database managing portion that manages the database, wherein the database managing portion is provided with an identification-information-searching portion that searches for, in the ladder-program-history information, identification information corresponding to a content of an alteration to be applied to an alteration-target machinery, and a merging portion that identifies the correction program corresponding to the searched identification information in the ladder-program-history information, and that merges the correction program with the ladder program for the alteration-target machinery.

DESCRIPTION OF EMBODIMENTS OF THE INVENTION

A ladder-program managing system provided with a ladder-program managing device according to an embodiment of the present invention will be described below with reference to the drawings.

Figure 1:
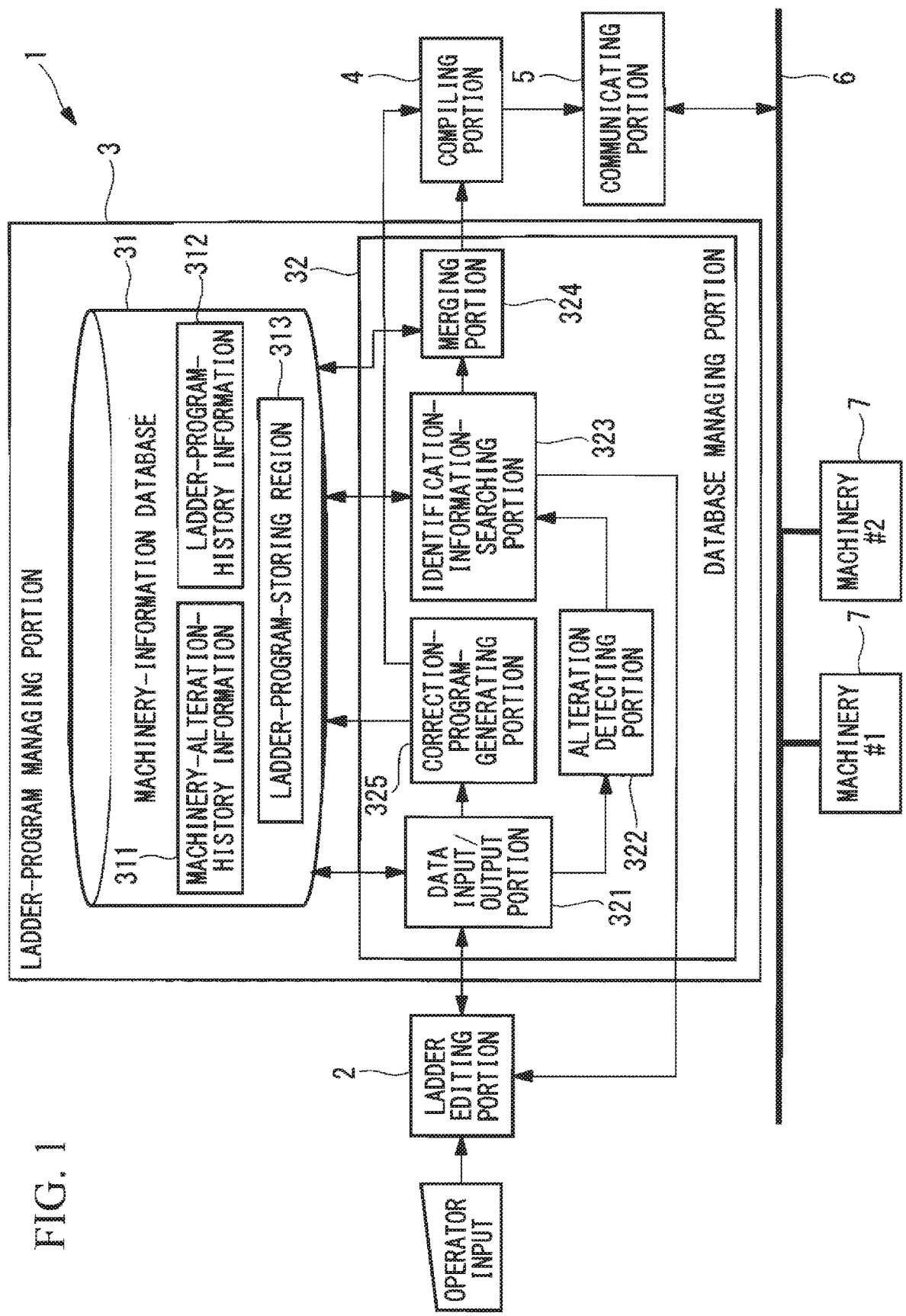
FIG. 1 is a block diagram showing, in outline, the configuration of a ladder-program managing system according to an embodiment of the present invention.

As shown in FIG. 1, a ladder-program managing system 1 is configured so as to manage a ladder program that is executed by means of a programmable controller (see FIG. 9) that controls pieces of machinery 7, such as machine tools or the like, that are connected with each other via a communication network 6, such as the Ethernet (registered trademark), FL-NET, or the like.

The ladder-program managing system 1 is provided, in the form of components connected via a bus, with: a processor (not shown); a main storage device such as a ROM (Read Only Memory), a RAM (Random Access Memory), or the like; an auxiliary storage device such as an HDD (Hard Disk Drive) or the like; an input device such as a keyboard or the like; an output device such as a monitor or the like; and an external interface that communicates various data with external equipment. The auxiliary storage device stores a program that realizes individual functions, described below, and the processor reads out the program into the main storage device from the auxiliary storage device, whereupon the program is executed.

As shown in FIG. 1, in terms of functions, the ladder-program managing system 1 is provided with a ladder editing portion 2, a ladder-program managing portion (ladder-program managing device) 3, a compiling portion 4, and a communicating portion 5.

The ladder editing portion 2 is connected to the ladder-program managing portion 3 and is configured so as to allow an operator to edit data, such as a ladder program or the like, that are managed by the ladder-program managing portion 3.

The compiling portion 4 is connected to the ladder-program managing portion 3 and the communicating portion 5, compiles ladder programs generated by the ladder-program managing portion 3, generates object code that can be executed in the pieces of machinery 7, and transmits the object code to the communicating portion 5.

The communicating portion 5 is connected to the pieces of machinery 7 via the communication network 6, and transmits the object code generated by the compiling portion 4 to the pieces of machinery 7 that are transmission destinations.

Note that, in FIG. 1, although the two pieces of machinery 7, referred to as a machinery #1 and a machinery #2, are connected to the ladder-program managing system 1 via the communication network 6 for the purpose of describing the system, there is no limitation thereto, and three or more pieces of machinery 7 may be connected to the ladder-program managing system 1. In addition, in this embodiment, these pieces of machinery 7 are of the same model and, for all of the pieces of machinery 7, the same ladder programs are used as ladder programs for controlling the pieces of machinery 7 themselves; however, there is no limitation thereto, and different models may be employed, and ladder programs that differ from each other may be employed as the ladder programs for controlling the pieces of machinery 7 themselves.

In the following, the ladder-program managing portion 3 will be described in detail. Note that, unless specific descriptions are given, the following embodiment will be described by assuming that equipment #1 and equipment #2 are added to machinery #1 as peripheral equipment, and that equipment #2 is added to machinery #2 as peripheral equipment.

The ladder-program managing portion 3 is provided with a machinery-information database (database) 31 and a database managing portion 32 that manages the machinery-information database 31.

The machinery-information database 31 is provided with machinery-alteration-history information 311, ladder-program-history information 312, and a ladder-program-storing region 313.

Figure 2:
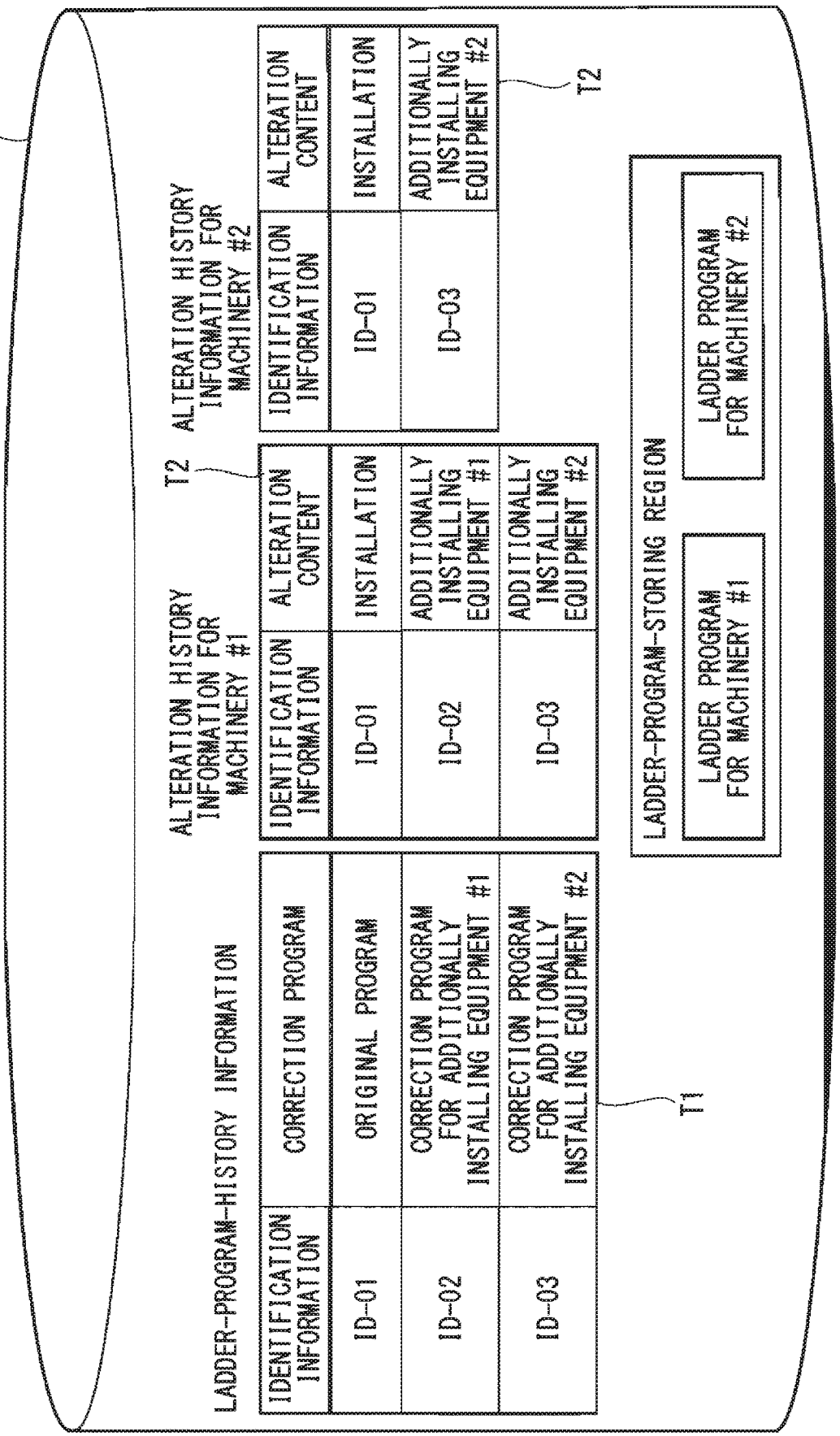
FIG. 2 is a diagram showing the internal configuration of a machinery-information database provided in a ladder-program managing portion of the ladder-program managing system in FIG. 1.

The machinery-alteration-history information 311 stores information about the history of alterations applied to the pieces of machinery 7 connected to the ladder-program managing system 1 for each piece of machinery 7. As shown in FIG. 2, in this embodiment, the machinery-alteration-history information 311 contains, separately for machinery #1 and machinery #2, an alteration-history table T2 that stores sets of alteration contents and identification information corresponding thereto. In the example shown in FIG. 2, alterations indicated as "INSTALLATION", "ADDITIONALLY INSTALLING EQUIPMENT #1", and "ADDITIONALLY INSTALLING EQUIPMENT #2" are sequentially applied to machinery #1, and "ID-01", "ID-02", and "ID-03" are assigned thereto, respectively, as the identification information thereof. Alterations indicated as "INSTALLATION" and "ADDITIONALLY INSTALLING EQUIPMENT #2" are sequentially applied to machinery #2, and "ID-01" and "ID-03" are assigned thereto, respectively, as the identification information thereof.

The ladder-program-history information 312 contains a history-information table T1 that stores sets of the identification information indicating the alteration contents and correction programs corresponding thereto. In the example shown in FIG. 2, "ORIGINAL PROGRAM" is a correction program required for the alteration identified by the identification information "ID-01", "CORRECTION PROGRAM FOR ADDITIONALLY INSTALLING EQUIPMENT #1" is a correction program required for the alteration identified by the identification information "ID-02", and "CORRECTION PROGRAM FOR ADDITIONALLY INSTALLING EQUIPMENT #2" is a correction program required for the alteration identified by the identification information "ID-03".

Here, a correction program refers to a program portion to be newly added to the pre-alteration ladder program when performing an alteration. For example, in order to operate machinery #1 in which equipment #2 is additionally installed, the original program for operating machinery #1 and the correction program for additionally installing equipment #2 are required. The correction program is generated by a correction-program-generating portion 325, described later, on the basis of a ladder program edited by the operator in the past.

The ladder-program-storing region 313 stores the most-recent ladder program for each piece of machinery 7. In this embodiment, the most-recent ladder program for machinery #1 and the most-recent ladder program for machinery #2 are stored therein.

As shown in FIG. 1, the database managing portion 32 is provided with an identification-information-searching portion 323 and a merging portion 324. In this embodiment, a data input/output portion 321, an alteration detecting portion 322, and the correction-program-generating portion 325 are additionally provided therein.

The data input/output portion 321 is connected to the ladder editing portion 2, the machinery-information database 31, the alteration detecting portion 322, and the correction-program-generating portion 325. The data input/output portion 321 is configured so as to perform check-out for allowing the operator to edit, via the ladder editing portion 2, the individual items of data of the ladder program stored in the ladder-program-storing region 313, the machinery-alteration-history information 311, and the ladder-program-history information 312, which are stored in the machinery-information database 31. In addition, the data input/output portion 321 is configured so as to perform check-in for storing the individual items of data edited by the operator via the ladder editing portion 2 in the machinery-information database 31.

The alteration detecting portion 322 is connected to the data input/output portion 321 and the identification-information-searching portion 323. The alteration detecting portion 322 is configured so as to detect an alteration by taking a difference between the machinery-alteration-history information 311, which is checked out from the machinery-information database 31 in the data input/output portion 321, and the machinery-alteration-history information 311, which is edited by the operator via the ladder editing portion 2 and checked into the machinery-information database 31.

The identification-information-searching portion 323 is connected to the alteration detecting portion 322, the machinery-information database 31, the ladder editing portion 2, and the merging portion 324. The identification-information-searching portion 323 searches, from the ladder-program-history information 312 in the machinery-information database 31, for the identification information that indicates the alteration detected by the alteration detecting portion 322, and transmits the searched identification information to the merging portion 324. In addition, in the case in which the identification information indicating the alteration detected by the alteration detecting portion 322 cannot be found in the ladder-program-history information 312, a notification indicating that the alteration is a new alteration that has not been performed in the past is issued to the ladder editing portion 2.

The merging portion 324 is connected to the identification-information-searching portion 323, the machinery-information database 31, and the compiling portion 4. The merging portion 324 merges the correction program that is stored in the machinery-alteration-history information 311 and that corresponds to the identification information transmitted thereto from the identification-information-searching portion 323 with the ladder program stored in the ladder-program-storing region 313, thus generating a new ladder program, and outputs the new ladder program to the compiling portion 4.

In the following, examples of merging executed by the merging portion 324 will be described with reference to FIGS. 3 to 6.

Figure 3:
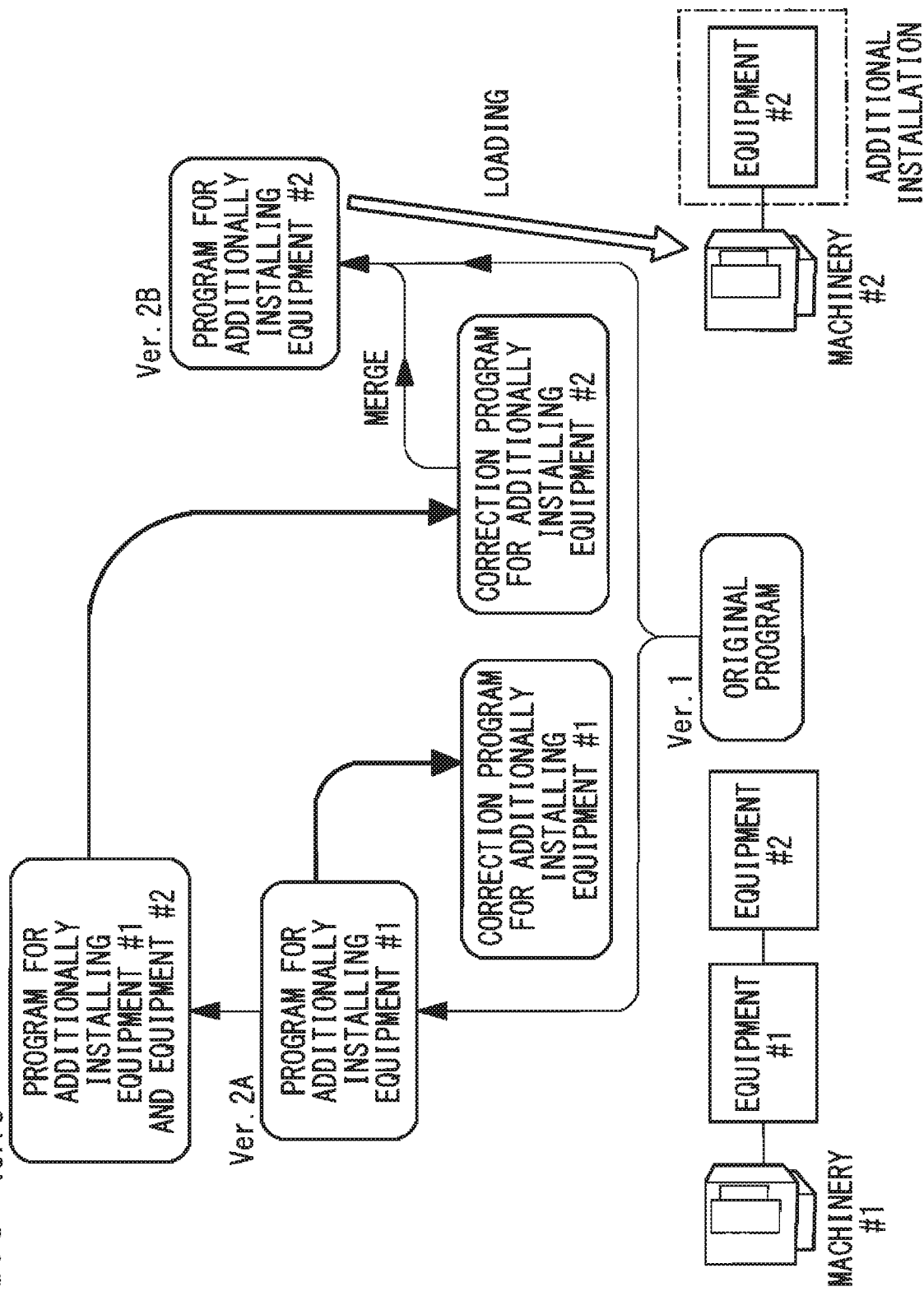
FIG. 3 is a diagram for explaining an example of merging executed by the ladder-program managing system in FIG. 1.

In the example shown in FIG. 3, an alteration in which equipment #1 and equipment #2 are sequentially additionally installed in machinery #1 has already been performed. When equipment #1 was additionally installed, the original program, which is Version 1 (Ver. 1), was edited by the operator, thus generating a program for additionally installing equipment #1, which is Version 2A (Ver. 2A), and the correction program for additionally installing equipment #1 was generated by the correction-program-generating portion 325, described later, on the basis of the program for additionally installing equipment #1. Subsequently, when equipment #2 was additionally installed, the program for additionally installing equipment #1, which is Version 2A, was edited by the operator, thus generating a program for additionally installing equipment #1 and equipment #2, which is Version 3 (Ver. 3), and the correction program for additionally installing equipment #2 was generated by the correction-program-generating portion 325, described later, on the basis of the program for additionally installing equipment #1 and equipment #2. Here, in the case in which an additional installation of equipment #2 is newly performed in machinery #2, the merging portion 324 merges the correction program for additionally installing equipment #2 with the original program, which is Version 1, thus generating a program for additionally installing equipment #2, which is Version 2B (Ver. 2B). The generated program for additionally installing equipment #2 is loaded into machinery #2 via the communicating portion 5 and the communication network 6 after being compiled by the compiling portion 4.

Figure 4:
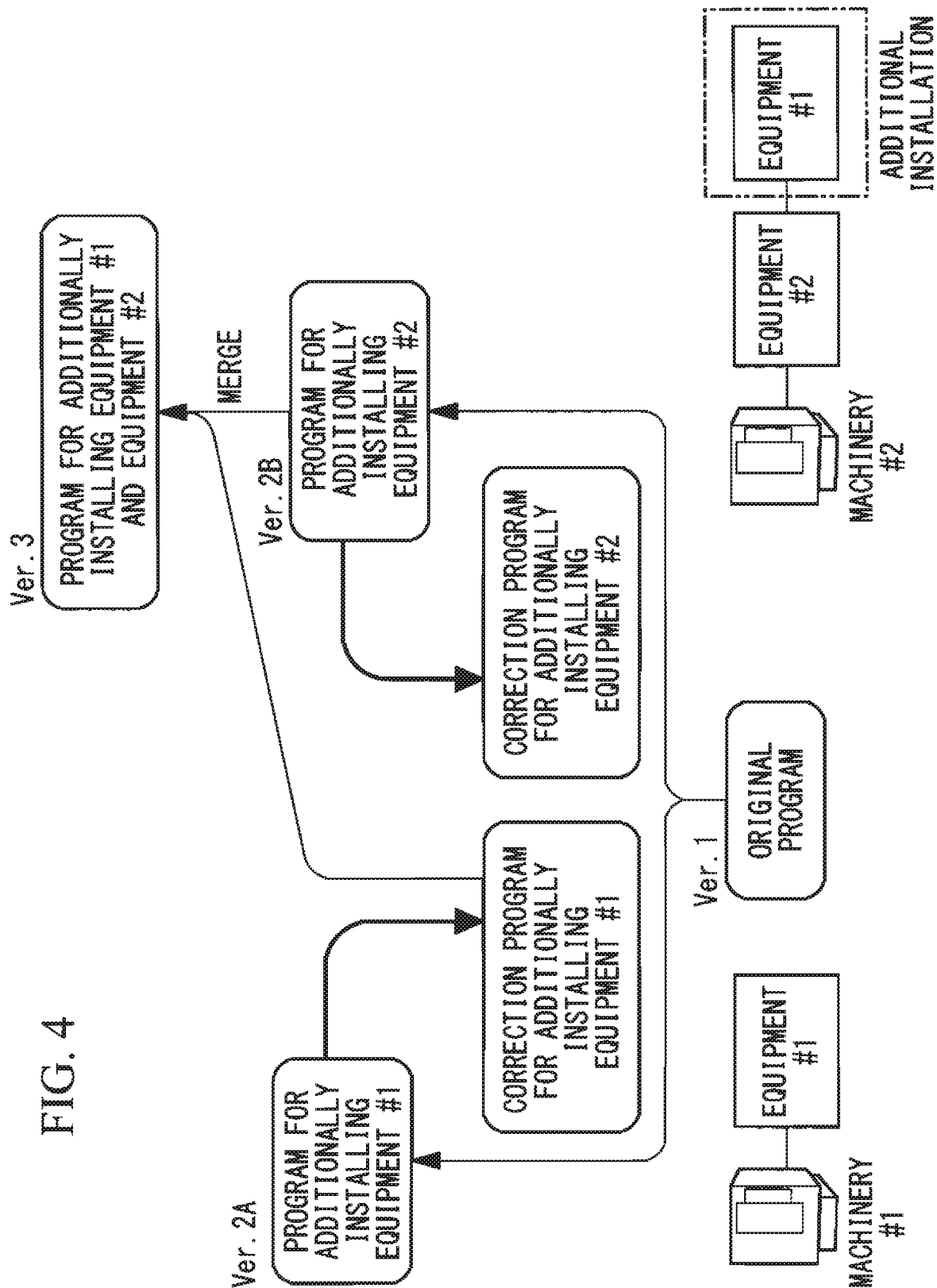
FIG. 4 is a diagram for explaining another example of merging executed by the ladder-program managing system in FIG. 1.

In the example shown in FIG. 4, an alteration in which equipment #1 is additionally installed in machinery #1 and equipment #2 is additionally installed in machinery #2 has already been performed. When equipment #1 was additionally installed in machinery #1, the original program, which is Version 1, was edited by the operator, thus generating the program for additionally installing equipment #1, which is Version 2A, and the correction program for additionally installing equipment #1 was generated by the correction-program-generating portion 325, described later, on the basis of the program for additionally installing equipment #1. Then, when equipment #2 was additionally installed in machinery #2, the original program, which is Version 1, was edited by the operator, thus generating the program for additionally installing equipment #2, which is Version 2B, and the correction program for additionally installing equipment #2 was generated by the correction-program-generating portion 325, described later, on the basis of the program for additionally installing equipment #2. Here, in the case in which an additional installation of equipment #1 is newly performed in machinery #2, the merging portion 324 merges the correction program for additionally installing equipment #1 with the program for additionally installing equipment #2, which is Version 2B, thus generating the program for additionally installing equipment #1 and equipment #2, which is Version 3.

Figure 5:
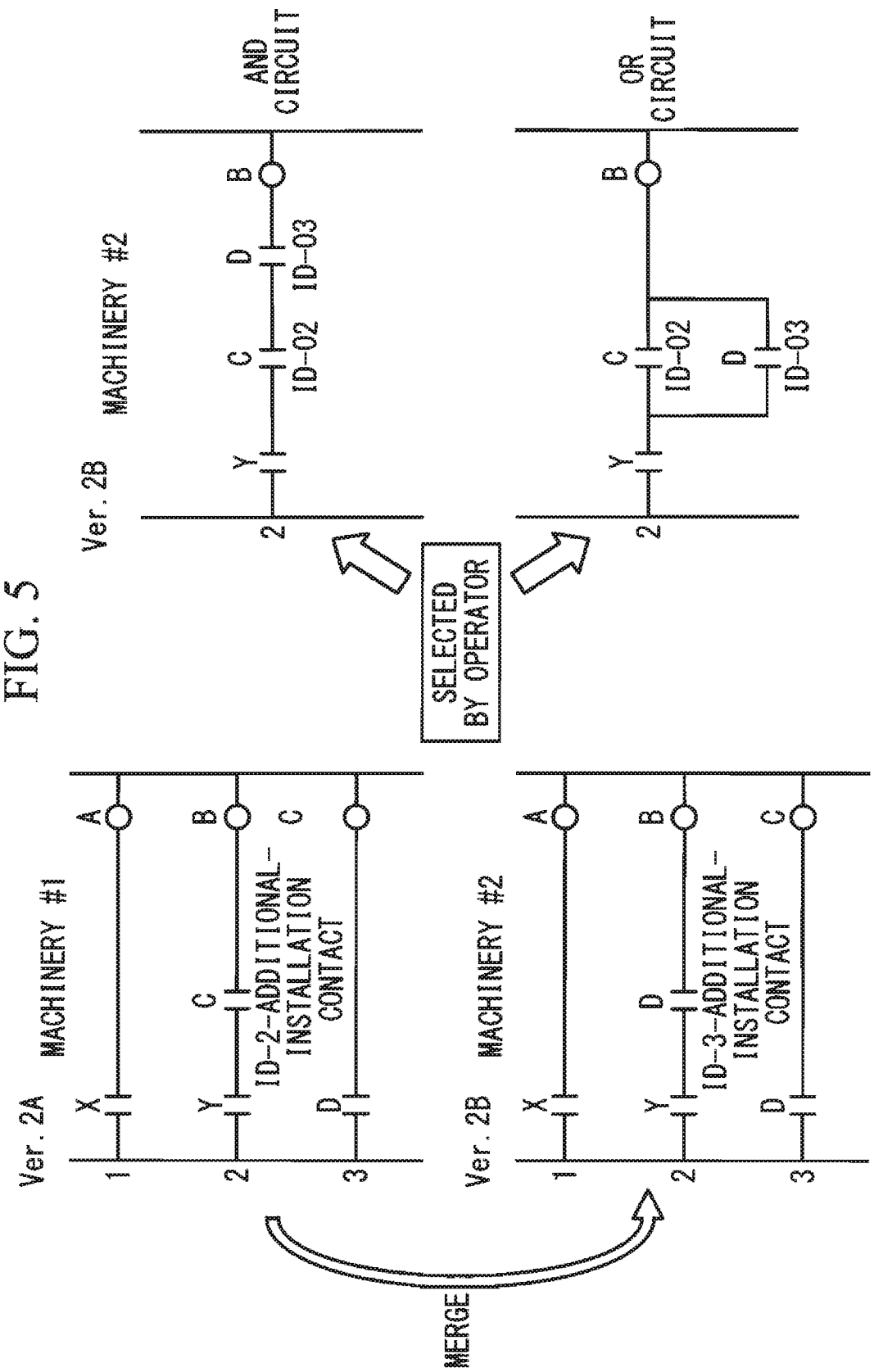
FIG. 5 is a diagram for explaining an example in which a conflict has occurred in merging executed by the ladder-program managing system in FIG. 1.

In the case in which the correction program is merged with a program derived from the original program, as in the example shown in FIG. 4, for example, a conflict shown in FIG. 5 sometimes occurs. At the upper left side of FIG. 5, the program for additionally installing equipment #1, which is Version 2A in FIG. 4, is shown, and, in an alteration in which equipment #1 is additionally installed, in other words, in the alteration identified by the identification information "ID-02", a correction in which a contact C (ID-02-additional installation contact) is provided in a rung referred to as a rung number 2 is performed. This corrected portion is the correction program for additionally installing equipment #1. At the lower left side of FIG. 5, the program for additionally installing equipment #2, which is Version 2B in FIG. 4, is shown, and, in an alteration in which equipment #2 is additionally installed, in other words, in the alteration corresponding to the identification information "ID-03", a correction in which a contact D (ID-03-additional installation contact) is provided in a rung referred to as the rung number 2 is performed.

In this situation, attempting to merge the correction program for additionally installing equipment #1 with the program for additionally installing equipment #2 causes a conflict between the contact C and the contact D in a rung referred to as the rung number 2, and thus, it is not possible to uniquely merge the programs. Therefore, the merging portion 324 generates two candidates (merge candidates), namely, an AND circuit in which the contact C and the contact D are connected in series, as shown at the upper right side of FIG. 5, and an OR circuit in which the contact C and the contact D are connected in parallel, as shown at the lower right side of FIG. 5, and presents the candidates to the operator. Then, the conflict is eliminated by the operator selecting one of the presented candidates, and appropriate merging is executed by the merging portion 324. In addition, by doing so, because the operator can easily eliminate a conflict, it is possible to reduce, as much as possible, the number of work man-hours required to perform an alteration.

Note that the number of the candidates generated by the merging portion 324 is not limited to two, and three or more candidates with which a conflict can be eliminated may be generated.

Figure 6:
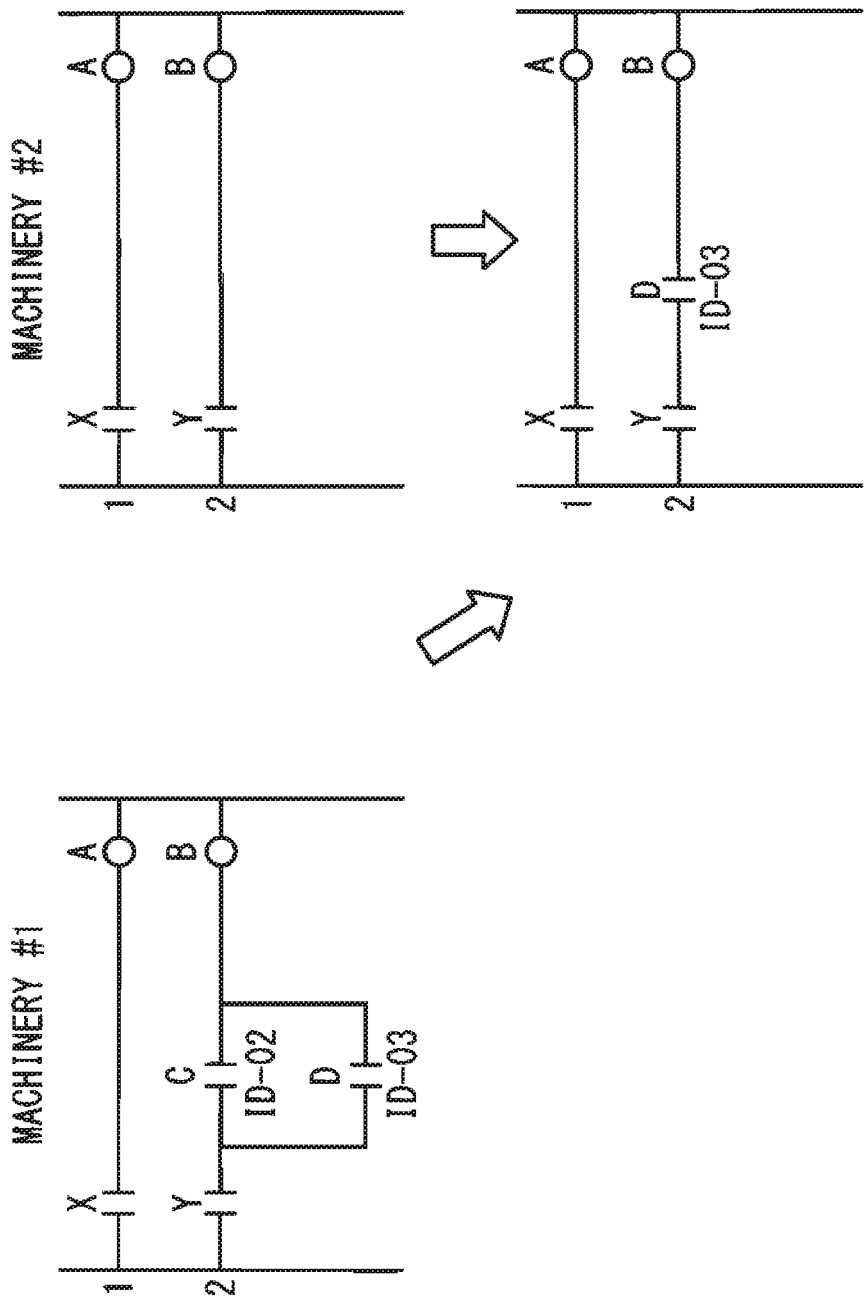
FIG. 6 is a diagram for explaining another example of merging executed by the ladder-program managing system in FIG. 1.

FIG. 6 shows another example of merging. This example assumes a case of applying merging associated with an alteration identified by the identification information "ID-03" to machinery #2. In the case in which the correction program to be merged includes a correction portion associated with an alteration identified by the identification information "ID-02", the merging portion 324 is configured so as to perform merging by identifying, in the correction program, only the correction portion associated with the alteration identified by the identification information "ID-03".

As shown in FIG. 1, the correction-program-generating portion 325 is connected to the data input/output portion 321, the machinery-information database 31, and the compiling portion 4. The correction-program-generating portion 325 generates the correction program on the basis of the difference between the ladder program that is checked out from the machinery-information database 31 in the data input/output portion 321 and the ladder program that is checked into the machinery-information database 31 in the data input/output portion 321. An example of a correction-program generating method will be described below with reference to FIG. 7.

Figure 7:
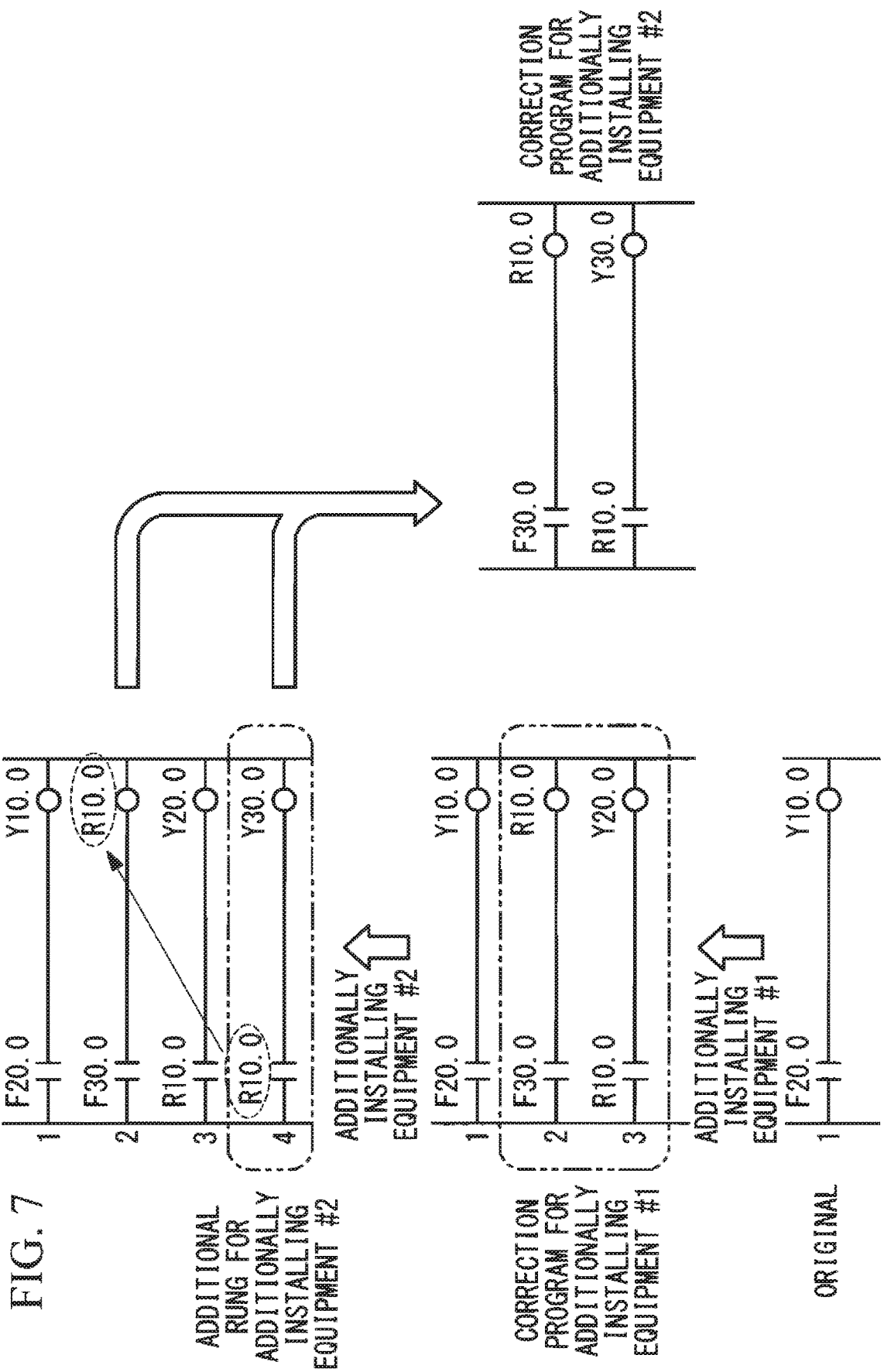
FIG. 7 is a diagram for explaining processing executed by a correction-program-generating portion provided in a database managing portion of the ladder-program managing portion in FIG. 1.

It is assumed that an original ladder program shown in the left-side bottom row of FIG. 7 is stored in the ladder-program-storing region 313 in the machinery-information database 31. Here, in the case of performing, for the first time, an alteration in which equipment #1 is additionally installed in machinery #1, in order to create a ladder program required to perform this alteration, the operator checks out the original ladder program from the machinery-information database 31 via the data input/output portion 321 and edits the ladder program via the ladder editing portion 2. For example, as shown in the left-side middle row of FIG. 7, the operator performs editing such that a ladder program formed of rungs referred to as rung number 2 and rung number 3 is added to the original ladder program, and checks the edited ladder program into the machinery-information database 31 via the data input/output portion 321. At this time, the correction-program-generating portion 325 registers a difference program, which is a difference between the checked-out original ladder program and the ladder program that is edited and checked in by the operator, in the ladder-program-history information 312 of the machinery-information database 31 in the form of the correction program for additionally installing equipment #1.

Next, in the case of performing, for the first time, an alteration in which equipment #2 is additionally installed in machinery #1 in which equipment #1 has been additionally installed, in order to create a ladder program required for performing this alteration, the operator checks out the current ladder program, that is, the ladder program for controlling machinery #1 in which equipment #1 has been additionally installed, from the machinery-information database 31 via the data input/output portion 321 and edits the ladder program via the ladder editing portion 2. For example, as shown in the left-side top row of FIG. 7, the operator performs editing such that a ladder program formed of a rung referred to as rung number 4 is added to the current ladder program, and checks the edited ladder program into the ladder-program-storing region 313 of the machinery-information database 31 via the data input/output portion 321. At this time, the correction-program-generating portion 325 generates the correction program for additionally installing equipment #2 by combining a difference program, which is a difference between the checked-out current ladder program and the ladder program that has been edited and checked in by the operator, and the rungs in which relays related to input/output relays (input/output signals shown in FIG. 9) included in the difference program are provided.

In other words, in the example shown in FIG. 7, the contact included in the difference program formed of the rung referred to as rung number 4 is operated by using a bit signal referred to as "R10.0" as an input signal, and an output signal related to this input signal is output from a coil provided in the rung referred to as rung number 2. Therefore, the correction program for additionally installing equipment #2 is generated by adding, to the difference program formed of the rung referred to as rung number 4, the program formed of the rung referred to as rung number 2 in which the coil that outputs the output signal related to the input signal of the difference program is provided.

Figure 9:
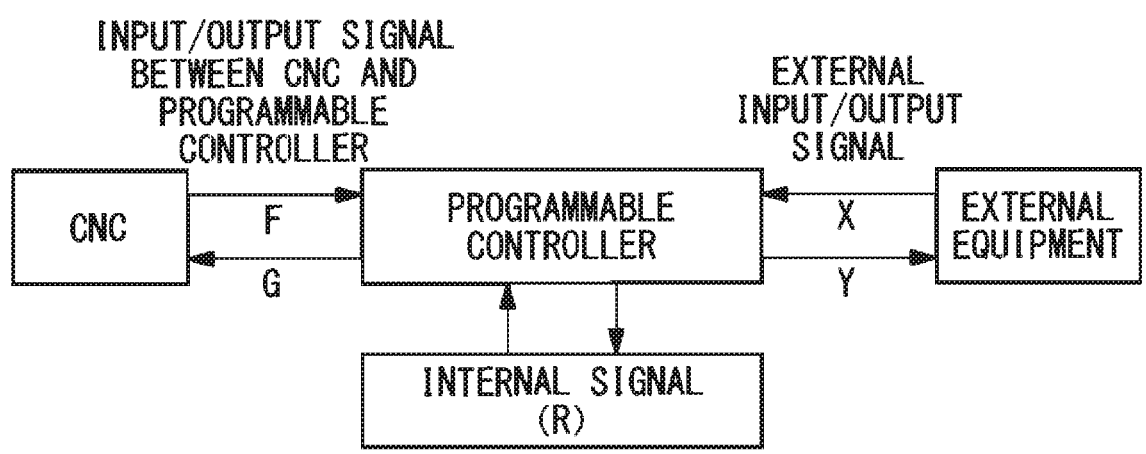
FIG. 9 is a diagram for explaining input/output of signals in a programmable controller with which a ladder program managed by the ladder-program managing system in FIG. 1 is executed.

Note that, as shown in FIG. 9, reference sign "R" assigned to the input/output relay shown in FIG. 7 indicates that a signal thereof is an internal signal that is communicated inside the programmable controller. Reference sign "F" assigned to the input/output relay shown in FIG. 7 indicates that a signal thereof is an input signal input to the programmable controller from a CNC (computerized numerical control) device. Reference sign "Y" assigned to the input/output relay shown in FIG. 7 indicates that a signal thereof is an output signal output to external equipment from the programmable controller. In addition, as shown in FIG. 9, reference sign "G" indicates that a signal thereof is an output signal output to the CNC device from the programmable controller, and reference sign "X" indicates that a signal thereof is the input signal input to the programmable controller from the external equipment, even though these reference signs are not used in the ladder program shown in FIG. 7.

The correction-program-generating portion 325 is configured to register the generated correction program for additionally installing equipment #2 to the ladder-program-history information 312 of the machinery-information database 31.

Furthermore, the correction-program-generating portion 325 transmits the ladder program edited by the operator to the compiling portion 4.

Note that, in the above-described examples, although the correction programs are generated by adding the rung-based programs to the difference programs, the correction programs may be generated by adding partial programs based on a unit smaller than the rung.

Next, a ladder-program managing method executed by the ladder-program managing system 1 will be described with reference to FIGS. 1 and 8.

Figure 8:
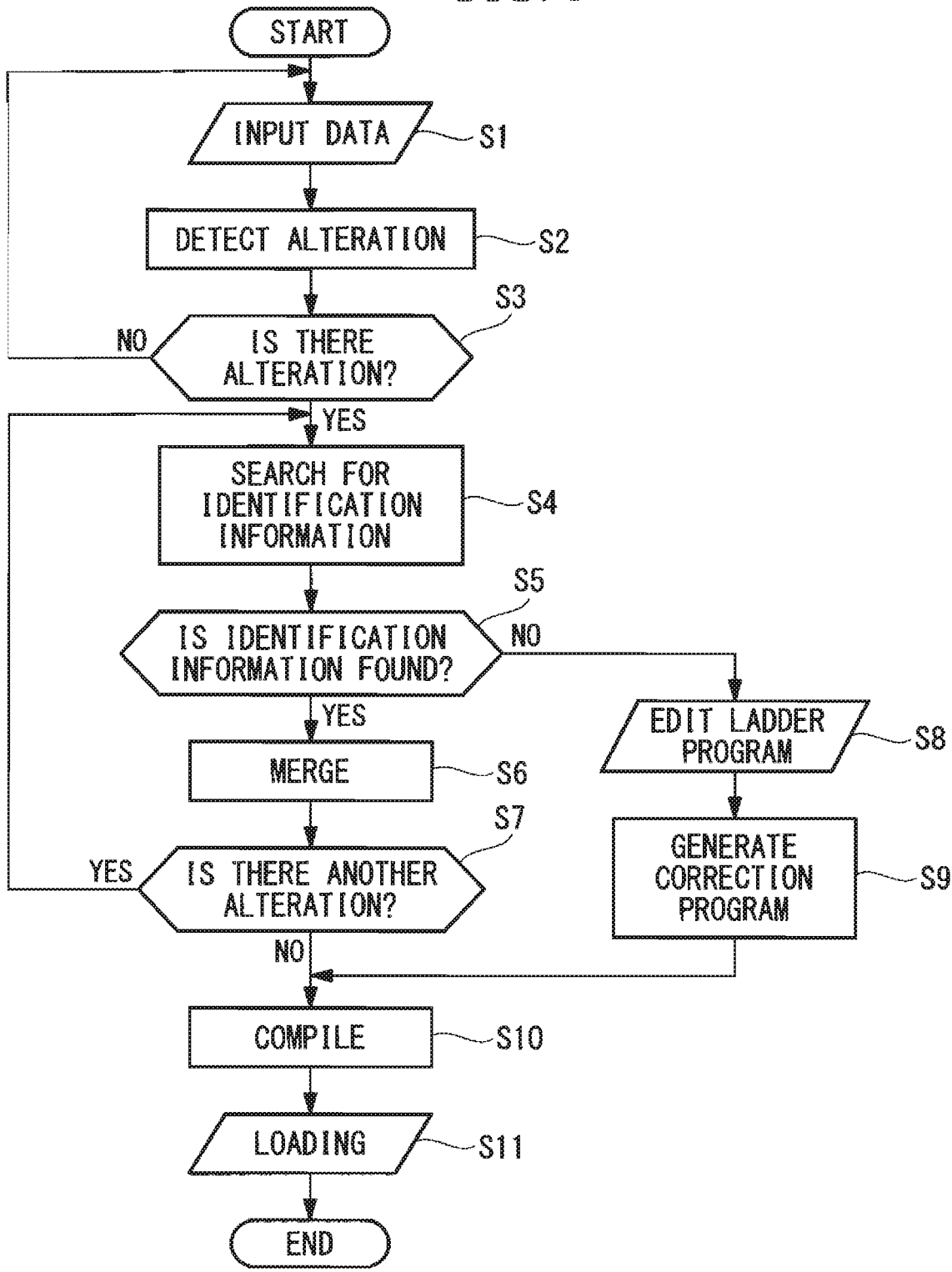
FIG. 8 is a flowchart showing processing executed by the ladder-program managing system in FIG. 1.

When alterations are applied to the pieces of machinery 7 connected to the ladder-program managing system 1 via the communication network 6, the operator inputs the data related to these alterations to the ladder-program managing system 1 (step S1 in FIG. 8). More specifically, the ladder editing portion 2 checks out, from the machinery-information database 31 via the data input/output portion 321, the alteration-history tables T2 for the pieces of machinery 7 to be subjected to the alterations in the machinery-alteration-history information 311. After the operator adds, via the ladder editing portion 2, the information related to the alteration contents and the corresponding identification information thereto, the checked-out alteration-history tables T2 are checked into the machinery-information database 31 via the data input/output portion 321.

At this time, the alteration detecting portion 322 monitors the alteration-history tables T2 to be checked out and the alteration-history tables T2 to be checked in, and alterations are detected by taking the differences between the two (step S2 in FIG. 8), and thus, it is determined whether or not alterations have been performed (step S3 in FIG. 8). In the case in which it is determined that there has been no alteration, the system stands by until the data are input in the data input/output portion 321.

In the case in which it is determined that there has been an alteration, the identification-information-searching portion 323 searches for the identification information indicating the alteration in the history-information table T1 indicating the ladder-program-history information 312 (step S4 in FIG. 8), and it is determined whether or not the identification information indicating the alteration is in the history-information table T1 (step S5 in FIG. 8).

In the case in which the identification information indicating the alteration is found in the history-information table T1, the merging portion 324 merges the ladder program that is for the machinery 7 to be subjected to the alteration and that is included in the ladder-program-storing region 313 with the correction program that corresponds to the identification information in the ladder-program-history information 312 indicating the alteration (step S6 in FIG. 8).

When merging is completed, it is determined whether or not there is another alteration (step S7 in FIG. 8). The procedure returns to step S4 in the case in which there is another alteration.

In the case in which there is no other alteration, the compiling portion 4 compiles the merged ladder program, and the object code thereof is generated (step S10 in FIG. 8).

Then, the generated object code is loaded to the alteration-target machinery 7 via the communicating portion 5 and the communication network 6 (step S11 in FIG. 8), thus completing processing.

As has been described above, because the ladder programs for each of the plurality of pieces of machinery 7 and the correction programs that correspond to the alterations executed in the past are organized in the form of a database and centrally managed, correction and maintenance are facilitated when newly executing an alteration associated with a ladder-program correction that is similar to an alteration executed in the past, and thus, it is possible to reduce, as much as possible, the amount of work man-hours required to perform the alteration.

In step S5 in FIG. 8, in the case in which the identification information indicating the alteration is not found in the history-information table T1, a notification indicating that the identification information indicating the alteration is not in the history-information table T1 is issued to the ladder editing portion 2 from the identification-information-searching portion 323. Then, upon receiving this notification, the ladder editing portion 2 prompts the operator to apply a correction required to perform the alteration to the ladder program. Subsequently, on the basis of the instruction given by the operator, the ladder editing portion 2 checks out the ladder program that concerns the machinery 7 to be subjected to the alteration and that is in the ladder-program-storing region 313 from the machinery-information database 31 via the data input/output portion 321. After the operator applies the correction required to perform the alteration thereto via the ladder editing portion 2, the checked-out ladder program is checked into the machinery-information database 31 via the data input/output portion 321 (step S8 in FIG. 8).

At this time, the correction-program-generating portion 325 generates the correction program on the basis of the difference between the checked-out ladder program and the checked-in ladder program, and the correction program is stored in the ladder-program-history information 312 (step S9 in FIG. 8). More specifically, the correction program is generated by means of the correction-program-generating portion 325 by adding, to the difference program, which is a difference between the ladder program that has been corrected by the operator in an alteration that has already been executed and the ladder program before this correction, portions related to the input/output signals in the difference program that is searched for from the pre-correction ladder program.

As has been described above, because not only the difference program but also the portions related to the input/output signals in the difference program are added to the difference program, it is possible to generate a correction program that is required and satisfactory for the alteration. In addition, by doing so, management of correction programs is facilitated.

In addition, the correction-program-generating portion 325 transmits the checked-in ladder program to the compiling portion 4. Then, the compiling portion 4 compiles the ladder program, the object code thereof is generated (step S10 in FIG. 8), and the generated object code is loaded into the alteration-target machinery 7 via the communicating portion 5 and the communication network 6 (step S11 in FIG. 8), thus completing the series of processing.

As has been described above, although the embodiment of the present invention has been described in detail with reference to the drawings, specific configurations are not limited to this embodiment, and design alterations within a range that does not depart from the scope of the present invention are also encompassed.

For example, in the above-described embodiment, although the correction-program-generating portion 325 provided in the database managing portion 32 generates the correction program, in the case in which a required correction program is stored in the ladder-program-history information 312 in advance, a configuration in which the database managing portion 32 is not provided with the correction-program-generating portion 325 may be employed.

Furthermore, although the above-described embodiment is configured so that, when the machinery-alteration-history information 311, which is input/output via the data input/output portion 321, is edited via the ladder editing portion 2, the alteration detecting portion 322 automatically detects an alteration and transmits the identification information corresponding to this alteration to the identification-information-searching portion 323, there is no limitation thereto. For example, it is permissible to employ a configuration in which the data input/output portion 321 and the alteration detecting portion 322 are omitted, the operator inputs the identification information corresponding to the alteration via the ladder editing portion 2, and the ladder editing portion 2 directly transmits the identification information to the identification-information-searching portion 323. In this case, the machinery-alteration-history information 311 of the machinery-information database 31 may be eliminated.

As a result, the above-described embodiment leads to the following aspect.

An aspect of the present invention is a ladder-program managing device including: a database that has a ladder-program-storing region in which ladder programs for individually controlling a plurality of pieces of machinery are stored, and that contains ladder-program-history information storing, in association with each other, identification information for identifying contents of alterations that have already been applied to the plurality of pieces of machinery and correction programs required to perform the alterations; and a database managing portion that manages the database, wherein the database managing portion is provided with an identification-information-searching portion that searches for, in the ladder-program-history information, identification information corresponding to a content of an alteration to be applied to an alteration-target machinery, and a merging portion that identifies the correction program corresponding to the searched identification information in the ladder-program-history information, and that merges the correction program with the ladder program for the alteration-target machinery.

With this configuration, the database has the ladder-program-storing region in which the ladder programs for individually controlling the plurality of pieces of machinery are stored, and contains the ladder-program-history information storing, in association with each other, the identification information for identifying the contents of the alterations that have already been applied to the plurality of pieces of machinery and the correction programs required for performing the alterations. Then, in the case in which a similar alteration is newly executed, the identification-information-searching portion provided in the database managing portion searches for, in the ladder-program-history information, the identification information corresponding to the contents of the alteration to be applied to the machinery that serves as an alteration target of the alteration. Subsequently, the merging portion provided in the database managing portion identifies the correction program corresponding to the searched identification information in the ladder-program-history information, and merges the correction program with the ladder program for the alteration-target machinery.

As has been described above, because the ladder programs for each of the plurality of pieces of machinery and the correction programs that correspond to the alterations executed in the past are organized in the form of a database and centrally managed, correction and maintenance are facilitated when newly executing an alteration associated with a ladder-program correction, and thus, it is possible to reduce, as much as possible, the number of work man-hours required to perform the alteration.

The ladder-program managing device according to the above-described aspect of the present invention may be configured such that the database managing portion may be provided with a correction-program-generating portion that generates the correction program, and the correction-program-generating portion may generate the correction program by adding, in the alteration that has already been executed, to a difference program, which is a difference between the ladder program that has been corrected by an operator and the ladder program before this correction, portions related to input/output signals in the difference program that has been searched for in the pre-correction ladder program.

With this configuration, the correction-program-generating portion provided in the database managing portion generates the correction programs by adding, to the difference programs, which are differences between the ladder programs that have been corrected by the operator in the alterations that have already been executed and the ladder programs before the correction, the portions related to the input/output signals in the difference programs that have been searched for in the pre-correction ladder programs.

As has been described above, because not only the difference program but also the portion related to the input/output signal in the difference program is added to the difference program, it is possible to generate a correction program that is required and satisfactory for the alteration. In addition, by doing so, management of the correction program is facilitated.

The ladder-program managing device according to the above-described aspect of the present invention may be configured such that, in the case in which a conflict occurs between the ladder program and the correction program, the merging portion may generate a plurality of merge candidates with which it is possible to eliminate the conflict.

With this configuration, in the case in which a conflict occurs between the ladder program and the correction program when performing merging, the merging portion generates the plurality of merge candidates with which it is possible to eliminate the conflict.

By doing so, because the operator can easily eliminate a conflict, it is possible to reduce, as much as possible, the number of work man-hours required to perform an alteration.

The present invention affords an advantage in that it is possible to facilitate a machinery alteration associated with a correction of a ladder program and to reduce, as much as possible, work man-hours.

The invention claimed is:

1. A ladder-program managing device comprising:
a storage that stores a database; and
a processor that is connected to the storage;
wherein the database includes:
   a ladder-program-storing memory region that stores ladder programs providing instructions for individually controlling a plurality of pieces of machinery,
   a machinery-alteration history information memory region that stores alterations applied previously to the plurality of pieces of machinery and identification information for identifying contents of the alterations, and
   a ladder-program-history information memory region that stores the identification information and correction programs required to perform the alterations;
wherein the processor is configured to:
   search for, in the ladder-program-history information memory region, the identification information corresponding to the contents of the alterations to be applied to an alteration-target machinery and, thereafter, to generate searched identification information;
   identify the correction program corresponding to the searched identification information;
   merge the correction program with the ladder program for the alteration-target machinery; and
   generate the correction program; and
wherein the correction program is generated by adding the alterations applied previously to the plurality of pieces of machinery to a difference program, wherein the difference program is a difference between a first ladder program before correction by an operator and a second ladder program after correction by the operator;
wherein, in the case in which a conflict occurs between the ladder program and the correction program, the merging of the correction program generates a plurality of merge candidates with which it is possible to eliminate the conflict.

* * * * *